(12) United States Patent
Davies et al.

(10) Patent No.: US 7,574,904 B1
(45) Date of Patent: Aug. 18, 2009

(54) ADVANCED HOT SECTION MATERIALS AND COATINGS TEST RIG

(75) Inventors: Daniel O Davies, Palm City, FL (US); Khalil O Qader, West Palm Beach, FL (US); Joseph Brostmeyer, Jupiter, FL (US); Jack W Wilson, Palm Beach Gardens, FL (US); Todd A Ebert, West Palm Beach, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 0 days.

(21) Appl. No.: 11/263,522

(22) Filed: Nov. 1, 2005

(51) Int. Cl.
*G01M 15/14* (2006.01)
(52) U.S. Cl. ................................... 73/112.01
(58) Field of Classification Search .............. 73/112.01, 73/112.03, 112.04, 112.05, 112.06
See application file for complete search history.

(56) References Cited

U.S. PATENT DOCUMENTS

| | | | |
|---|---|---|---|
| 3,263,485 A | 8/1966 | Mahmoodi | |
| 4,189,939 A * | 2/1980 | West et al. | ............. 73/116 |
| 5,080,496 A * | 1/1992 | Keim et al. | ............. 374/144 |
| 5,260,218 A | 11/1993 | Garde | |
| 5,707,147 A | 1/1998 | Kurkowski et al. | |
| 6,582,184 B2 * | 6/2003 | Little, Jr. | ................ 415/1 |
| 6,739,184 B2 * | 5/2004 | Brazeau et al. | ............ 73/118.1 |
| 6,923,051 B2 * | 8/2005 | Fleming | .............. 73/147 |
| 2003/0017046 A1 * | 1/2003 | Little, Jr. | ................ 415/1 |
| 2004/0154385 A1 * | 8/2004 | Acker | ................ 73/116 |
| 2004/0182143 A1 * | 9/2004 | Black | ............. 73/118.1 |
| 2004/0216535 A1 * | 11/2004 | Brostmeyer et al. | ........ 73/865.6 |

FOREIGN PATENT DOCUMENTS

JP 2003-315253 A 11/2003

* cited by examiner

*Primary Examiner*—Eric S McCall
(74) *Attorney, Agent, or Firm*—John Ryznic

(57) ABSTRACT

A test rig that reproduces high temperature and high pressure conditions found in a gas turbine engine for testing materials under these conditions. The test rig is formed of a plurality of modules connected in series to form the test rig. A specimen rotation module is connected to a mechanical load module, which is connected to a combustor module, which is connected to a test section module on which one or more test specimens are placed, which connects to an exhaust section module, which is connected to a thrust bearing & air inlet section module. The modules are cylindrical in shape and connected in series to form a compact test rig.

15 Claims, 20 Drawing Sheets

ADVANCED HOT SECTION MATERIALS AND COATINGS TEST RIG

STATEMENT REGARDING FEDERALLY SPONSORED RESEARCH OR DEVELOPMENT

None.

CROSS REFERENCE TO RELATED APPLICATIONS

None.

BACKGROUND OF THE INVENTION

1. Field of the Invention

The present invention relates to an apparatus and a method of testing materials in a high temperature and pressure environment, and thereby simulating actual conditions present in a gas turbine engine.

2. Description of the Related Art Including Information Disclosed Under 37 CFR 1.97 and 1.98

Existing known techniques for testing materials to be used in a gas turbine engine are very expensive or do not properly expose the testing material to actual engine operating conditions. One known method is to use an actual gas turbine engine and place the material to be tested on a part in the engine while the engine is operating. This method requires an operating gas turbine engine that is very expensive to operate. An engine test can test a material or a coating for: spallation due to high thermal gradients; erosion due to high velocity flow; corrosion degradation due to trace elements in fuel at operating temperatures and pressures; and, includes the ability to apply axial loading in addition to thermal loading to the test specimen. However, the engine test method is very expensive to operate (about $6,000 per hour to operate), the test conditions are limited to current technologies (pressures, temperatures, stresses) used in the specific testing gas turbine engine, availability of engine hardware, engine test facility, and large staffing requirements, and limited hot time accumulated (generally less than 300 hours).

A less costly method of testing that does not require an operating gas turbine engine is a burner rig. Existing rigs for testing turbine coating/material combinations use a hot flame impingement onto a material/coating specimen to ascertain material/coating durability under hot conditions. While these burner tests are more easily accomplished than full engine tests, are typically of low cost, and are sometimes satisfactory as a screening method, they fail to duplicate many of the parameters leading to material/coating failures observed in actual component designs. Of the conditions described above with respect to the engine test method, a burner rig can provide for a low cost method of testing materials, the burner rig does not allow for the testing for: coating spallation due to high thermal gradients; for erosion to high velocity flow; or for the ability to apply axial loading in addition to thermal loading to the test material.

Realistic engine gas path conditions include high thermal gradients in the test specimen, thermal and mechanical fatigue loading, and erosion due to high velocity gas flow. In real engines, the coating/material components are subjected to cyclical mechanical loading that can affect metal and coating durability and coating adhesion. In addition, the hot gas often contains trace contaminants that can cause corrosion of the metal/coating systems. High velocity gas flows can erode the gas path materials which also reduce their durability. Burner rigs are limited in that no mechanical loading can be applied to the specimen, and that the flow is not at high velocity so that TMF and erosion mechanisms are not duplicated in the test system.

Other complex systems are being developed for advanced testing of gas path materials. The Westinghouse Plasma Corporation's facility in Waltz Mills, Pa. uses a plasma torch to heat material specimens to high thermal loading and also includes mechanical loading capability to simulate TMF conditions. Currently the system is limited to heat flux levels less than 1.2 MBtu/hr/ft$^2$. The system is also not able to support investigation of erosion failure mechanisms since there is no high velocity flow. Moreover, the ability to accurately measure temperature on the front and backsides of the specimen (to determine thermal gradient) is questionable.

A third system is under development by NASA as part of the Ultra Efficient Engine Technology (UEET) program. This system uses a laser generated heat flux to heat the specimen to high thermal gradients. The current system can achieve approximately 1 MBtu/hr/ft$^2$. It is unknown if mechanical loading can be applied to the specimen, however, the system is limited in its ability to duplicate erosion failure mechanisms. Further, the system is not pressurized, but does have cooling through the middle of the specimen.

The degradation process that require characterization include coating erosion, spallation, thermal mechanical fatigue, low cycle fatigue, hold-time effects, as well as the interaction of these failure mechanisms. With extremely high cost of developing a new engine concept, especially when operating conditions will exceed all current experience, low cost test rigs are the prudent way to screen new concepts and materials prior to committing to actual engine hardware and full engine testing.

There is a need in the prior art for a test rig that can provide a low cost way to test materials for use in gas turbine engines, as well as a test rig that can reproduce all the conditions such as high temperature, high pressure, erosion, corrosion, and thermal and mechanical loading, that occur in an operating gas turbine engine.

It is an object of the present invention to provide for an apparatus and a method that can test materials at a very low cost.

It is an additional object of the present invention to provide for an apparatus and a method to test materials under the extreme conditions operating in a gas turbine engine.

It is a further object of the present invention to provide for an apparatus and a method that can test materials at temperatures above the maximum temperature permitted by today's material limitations.

It is still a further object of the present invention to provide for an apparatus and a method that can test materials under axial and thermal loadings.

BRIEF SUMMARY OF THE INVENTION

The inventors of the present invention have developed an innovative approach for testing advanced materials and coatings for the gas turbine industry. The effort is in response to the industry's need to understand how hot gas path materials and coatings will perform under advanced turbine operating conditions. Emerging missions are being designed to operate at high overall pressure rations, high turbine temperatures, and for extended periods of time. A low-cost test facility that can simulate Versatile Affordable Advanced Turbine Engine (VAATE) conditions is required to economically test the combustor and turbine materials and thermal/environmental barrier coatings that are needed to satisfy extreme operating parameters. The inventors have developed a unique low-cost/ high heat flux materials test system to simulate the VAATE engine missions. The design offers a high heat flux (up to 1.5 million MBtu/hr/ft$^2$ without film cooling, thermal and mechanical fatigue loading at engine representative conditions, and lower cost of testing of high thermal gradient gas path conditions.

The test rig of the present invention will allow coated specimens to be exposed to hot gas at accurate engine temperatures and pressures, with mechanical (axial tensile) loads applied via a pressure diaphragm. The test conditions are pressures of up to 50 atmospheres and temperatures of up to 4000 degrees F., which exceed current testing capabilities, represent future advanced engine hot gas path conditions on one side of the sample, and cooling side heat transfer on the other side of the sample.

The test rig of the present invention can be used to investigate the durability of a combination of substrate materials, thermal barrier coatings (TBC), and bond coats in an environment and under loading conditions that closely represent a turbine engine airfoil in its gas path. Extreme temperature gradients and transients thermally induce the most severe cyclic stresses that turbine airfoils encounter. These thermally induced stresses, which combine with mechanically induced centrifugal and gas bending loads produce thermal mechanical fatigue (TMF) of the airfoil. Strain range, temperature, mean stress, frequency and dwell time are important parameters affecting the TMF life of turbine airfoils and their coatings. The coating and bond coat play key roles in the TMF failure process; consequently the alloy, the bond coat and the coating must be considered a system for TMF evaluations. The test rig will provide a cost effective means to test combinations of coated airfoil systems in a representative environment and realistically characterize their damage states. These data combined with thermal and structural analyses, and life-modeling developments, will provide the basis for a reduced risk airfoil design process for gas turbine engines.

The value of the test rig of the present invention in developing advanced materials and coatings for turbine and combustor applications has been recognized by the military and industrial engine manufacturers and coating suppliers. The test rig of the present invention is comprehensive and offers turbine engine designers an affordable, quick method to evaluate coatings and high temperature materials without having to rely on costly, time consuming full engine tests. It also reduces the risk of failures that could occur during full engine testing of a new coating or high temperature alloy. What makes the test rig of the present invention so valuable is its ability to simulate aggressive engine conditions at low cost, enabling long-term engine relevant conditions without the expense of a full engine test.

The test rig of the present invention utilizes a small multi-port radial jet combustor to produce a hot gas stream. The hot gas is accelerated into a test section that includes of a cooled inner pipe containing the test material coupons and coatings. Temperature and pressure are carefully maintained within the annular passage by control of the combustor air supply pressure, the airflow rate, and the fuel flow rate. Up to 32 strategically placed sensors measure the pressure and temperature at critical locations within the test section. Computer controlled software allows for monitoring of conditions in real time. An innovative cooling design enables the specimen surface temperature to be accurately controlled throughout the course of the test.

High heat flux and thermal gradient is accomplished by subjecting the test coupon to two different thermal environments. One side of the specimen is exposed to high velocity combustion gas (up to 4000 F and 50 atmospheres), representing the hot gas side of the coated airfoil. The other side is exposed to a coolant (such as pressurized water) that represents airfoil coolant air.

To simulate turbine blade environments on both the hot gas flow path side as well as the cooling circuit side, a cylindrical sample was selected which is placed inside a larger cylindrical vessel. An annular hot gas flow path is formed by the outside diameter of the test article and the inside diameter of the outer vessel. The inner diameter of the sample serves as a cooling flow conduit. High velocity hot gas to 4000 F and cooling temperatures to 1200 F are used to create a representative engine environment. For any given fixed hot gas (source) and coolant temperature (sink), there exists a range of temperatures that depend solely on the overall thermal resistance in the radial direction.

Rotation of the test specimen within the testing environment is performed in order to produce a more uniform heat flux around the specimen. The speed of rotation needs to be faster than the thermal time constant for the material system being tested. If the rate of rotation is too great, however, further heat transfer variation may be induced due to aerodynamic effects of rotating cylinders in cross flow.

Since operating cost is largely driven by gas flow rate, minimizing flow is of paramount priority. Annular dimensions are selected to operate within this desired range of flows while maintaining the range of convective resistances required to meet goal heat flux levels. Varying flow rate then controls the hot gas path convective resistance. Since the same flow rate is used for the cooling side, the inside coolant convective resistance is independently controlled by placing a solid plug inside the test specimen to form an annular coolant passage, which varies the coolant gas velocity.

For any given hot gas (source) and coolant temperature (sink), there is a range of temperatures that depend solely on the overall thermal resistance in the radial direction. In the absence of radiation, the overall thermal resistance can be delineated into convective (gas and coolant side) and conductive (substrate) mechanisms. While the conductive effects are passive, the convective effects can be controlled. Changing the levels of both hot gas and coolant convection allows for control of the test specimen temperature to a desired value. For a fixed annular geometry, varying flow rate and pressure can control the desired external hot gas convection.

An outer hot gas path is formed by a test vessel that is made of copper-beryllium to provide high heat transfer rate and good structural strength. The vessel is formed on the outer surface with cooling ribs or fins, and when the vessel is mounted within a cover forms a water-cooling path over the cooling ribs. Cooling water that flows through the ribbed cooling path is pressurized to prevent boiling and to minimize pressure differential and mechanical loading across the vessel test section housing.

DETAILED DESCRIPTION OF THE INVENTION

Figure 1:
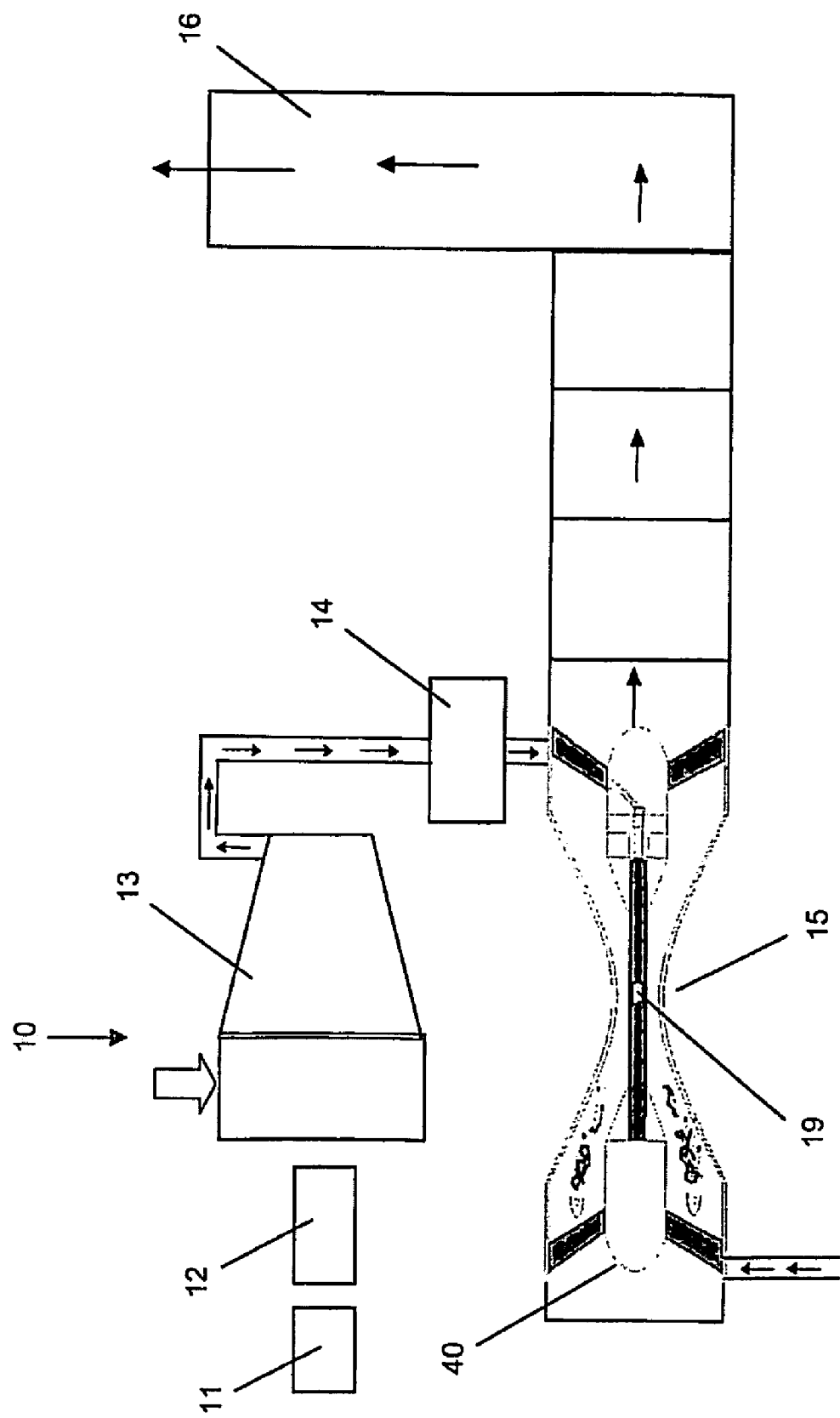
FIG. 1 shows a schematic diagram of the concept of the test facility of the present invention.

The present invention is a low-cost test facility that can simulate operating conditions in a gas turbine engine for economical testing of combustor and turbine materials and thermal/environmental barrier coatings that are needed to satisfy extreme operating parameters for extended periods of time. The general arrangement of the test facility 10 is shown in FIG. 1 which includes an electric motor 11 that drives a gearbox 12, an inter-cooled industrial compressor 13 driven by the gearbox 12, an inlet filter to filter air supplied to the compressor 13, a pre-heater 14 to preheat the compressed air delivered from the compressor 13, a load cell to apply a load to a test section, the test section on which a test specimen 19 is mounted, a combustor 40 to burn a fuel with the compressed air from the compressor 13 to produce a hot gas stream, and an exhaust passage leading from the test section to a stack 16 to exhaust the hot gas from the combustor. Compressed air is passed through the hollow tube 51 that forms the test cell and into the combustor 40. This supply air through the test section provides cooling air for the inner surface of the test specimen 19. Since the cooling air for the test specimen 19 is not exhausted to the environment, but is burned with the fuel, this arrangement improves on the efficiency of the facility.

The test rig 15 of the present invention is made up of a series of 6 modules (FIG. 2) that enable operation over the desired range of conditions, providing predictable and repeatable conditions. The 6 modules are the specimen rotation module 20, the mechanical load module 30, the syngas combustor module 40, the test section module 50, the exhaust section module 60, and the thrust bearing and air inlet section module 70. These 6 modules connect in a series arrangement to form the test rig 15. Each module is described in further detail below.

Figure 3:
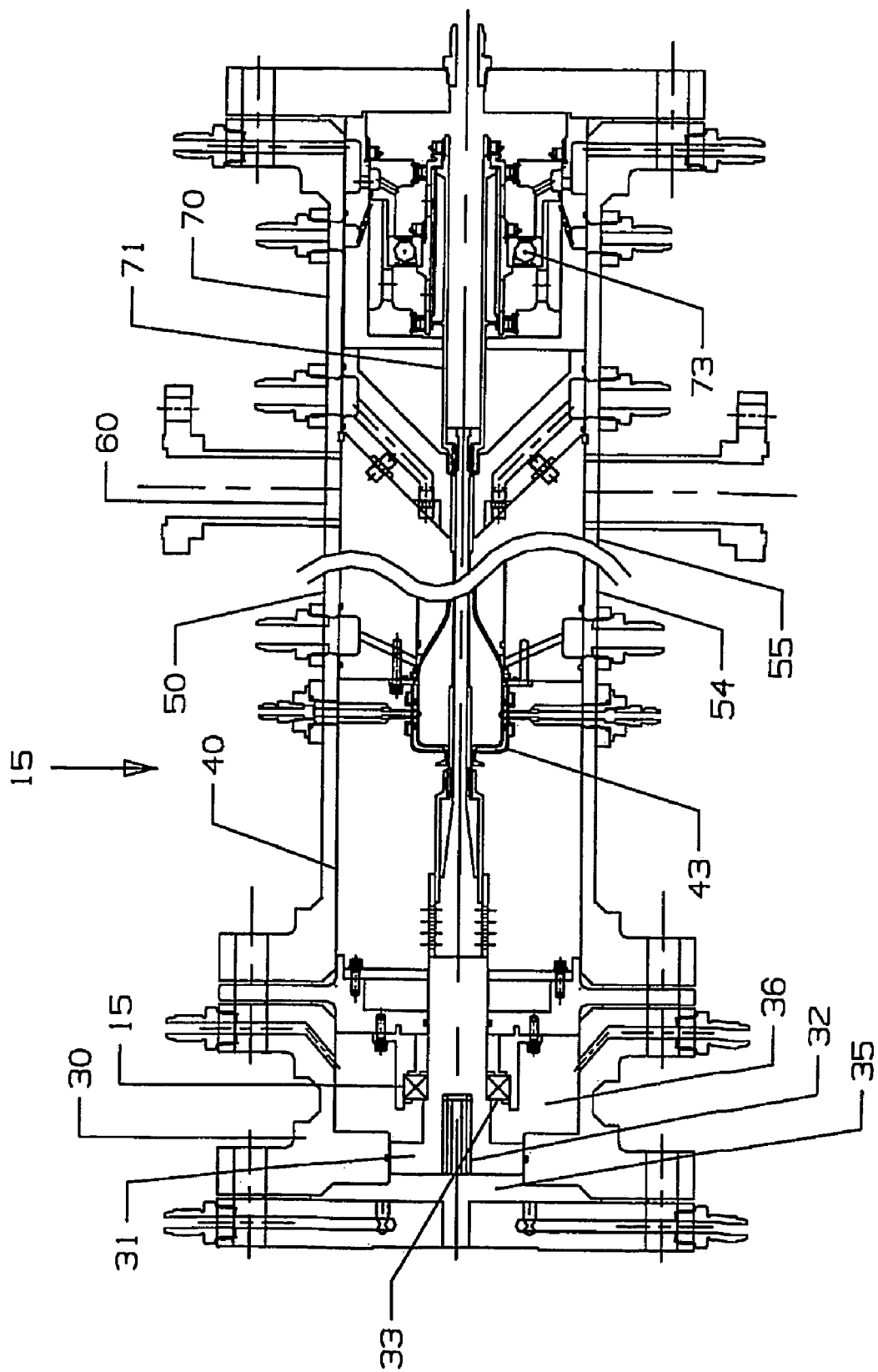
FIG. 3 shows a cross section view of the test rig with the modulation of chamber pressures showing the force to load a test sample and the bearing reactions to the axial load applied.
Figure 13:
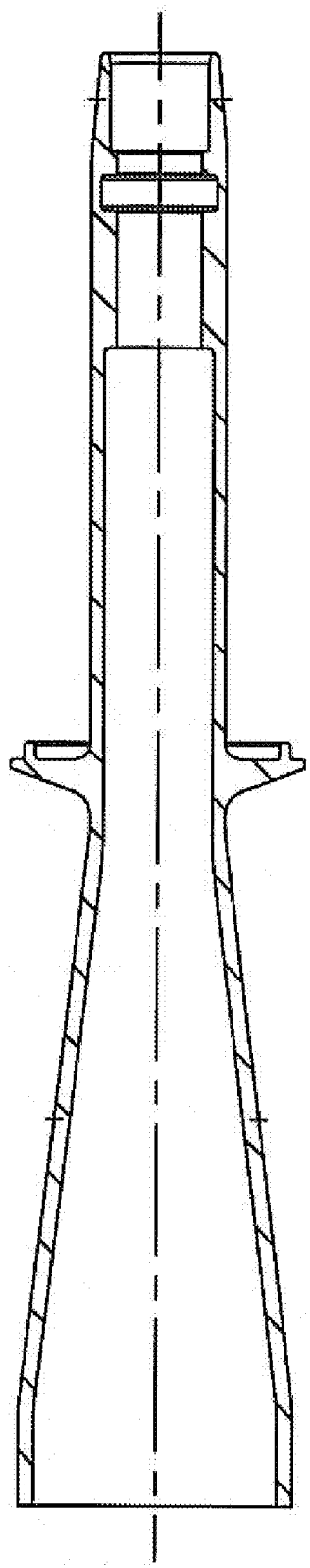
FIG. 13 shows a front view of the combustor inner shell.

FIG. 3 shows the test rig 15 with the mechanical load module 30, the syngas combustor section module 40, the test section module 50, the exhaust section module 60, and the thrust bearing & air inlet section module 70. A load piston 31 that operates in a cylinder applies the axial load to the test specimen tube 51. The drive shaft from a magnetic coupling is connected to the load piston 31 by a spline 32 in order to allow the load piston 31 to move axially with respect to the rotating shaft driven by the magnetic coupling, which rotates but does not have any axial movement. The load piston 31 is connected to a combustor end support member 35 (shown in detail in FIG. 13) in which both the load piston 31 and the support member 35 rotate and move axial as a unit. The rear end of a test specimen support tube 51 is connected to a cooling air supply tube 71 as shown in FIG. 3 that is supported by a radial and axial load bearing 73, and the air supply tube 71 also rotates and moves axially with the test specimen support tube.

The test rig 15 of the present invention is shown in FIG. 3, and includes the radial jet combustor assembly 43 which is made of Hastalloy-X, a test section vessel and cover 54, a test section housing 55 with water manifolds and bored passages, and a rear cover plate. The combustor assembly 43 is secured to a front portion of the test section vessel and cover 54, and the test section vessel and cover 54 fits within an axial opening within the test section housing 55. A rear cover plate closes the rear end of the housing 55. The radial jet combustor 43 of the present invention is designed to operate on syngas synthetic gas), but could be modified to operate on natural gas. The combustor is sized for a nominal airflow of 0.5 pps. The combustor has 6 swirlers 46 oriented radially around the outer liner to mix 30% of the airflow with fuel from the 6 gas nozzles 42. To use the injectors with syngas instead of natural gas, the 18 tip holes on the nozzles 42 needs to have a diameter of 0.016 inches to 0.024 inches.

Figure 4:
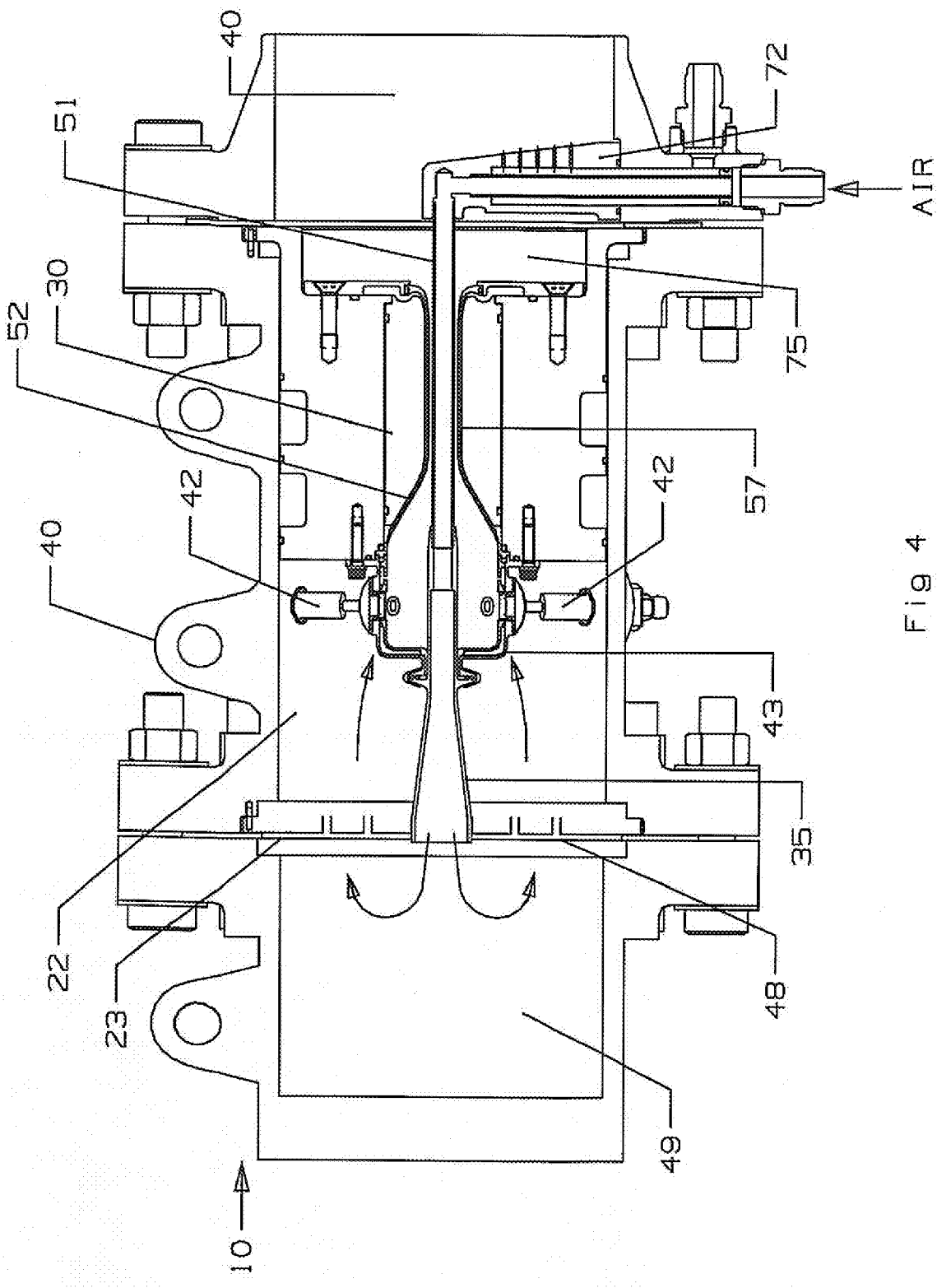
FIG. 4 shows a cross section view of an alternate embodiment of the test rig in which the rear support member for the test specimen tube is at 90 degrees to the tube.
Figure 14:
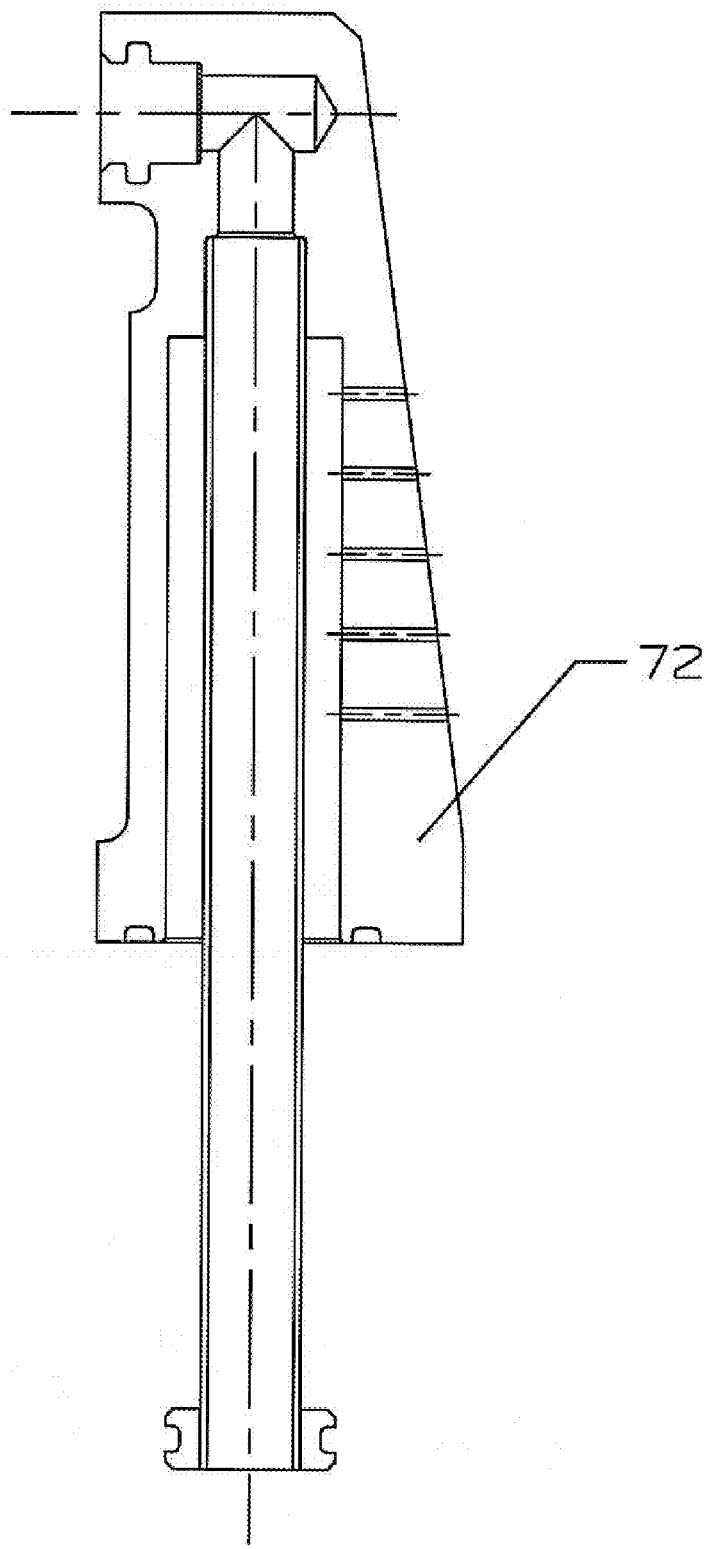
FIG. 14 is a cross section view of a Support Member at the Combustor end.
Figure 15:
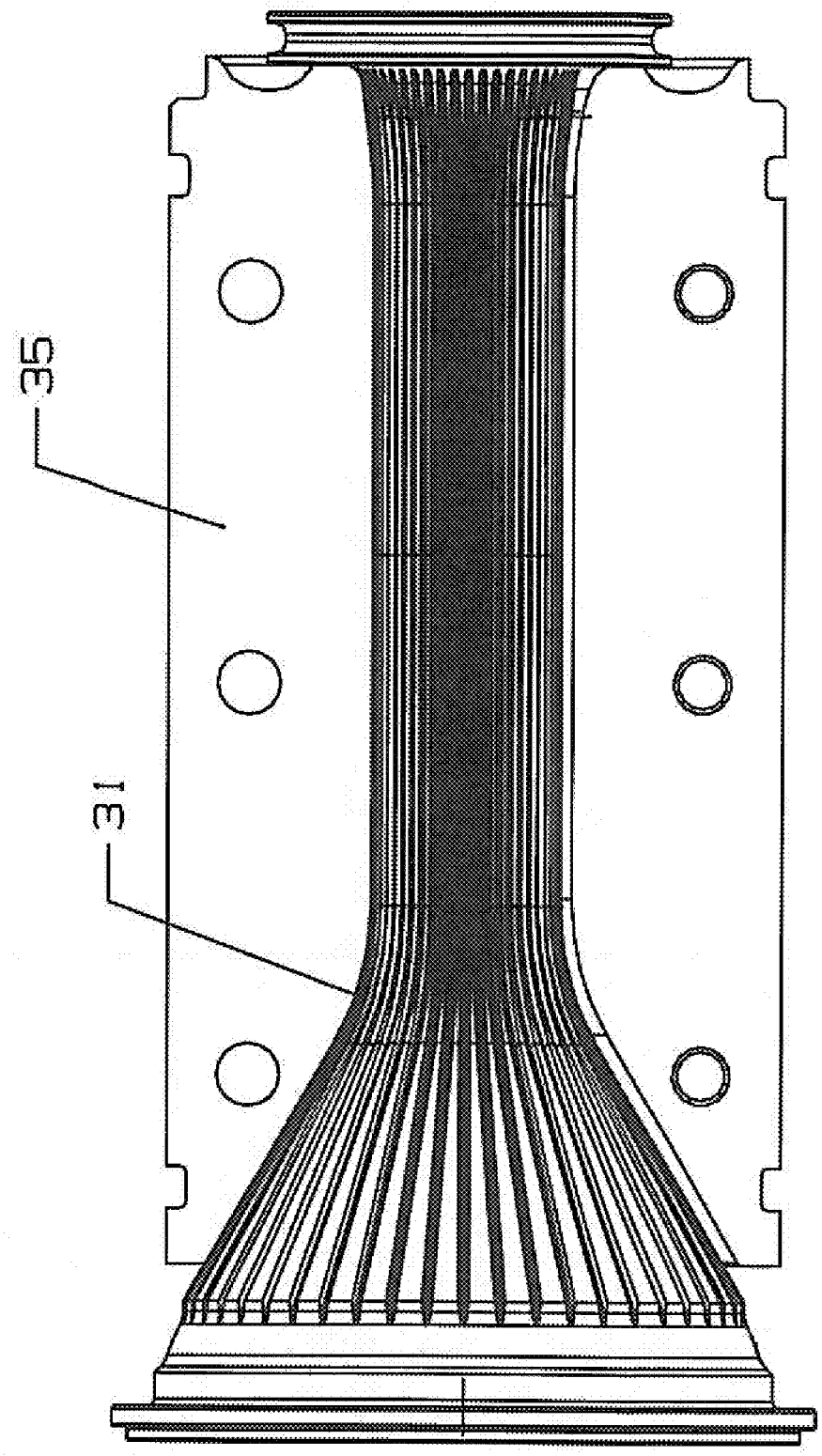
FIG. 15 shows a side view of the Cooling Vessel mounted in a Cover Half.
Figure 16:
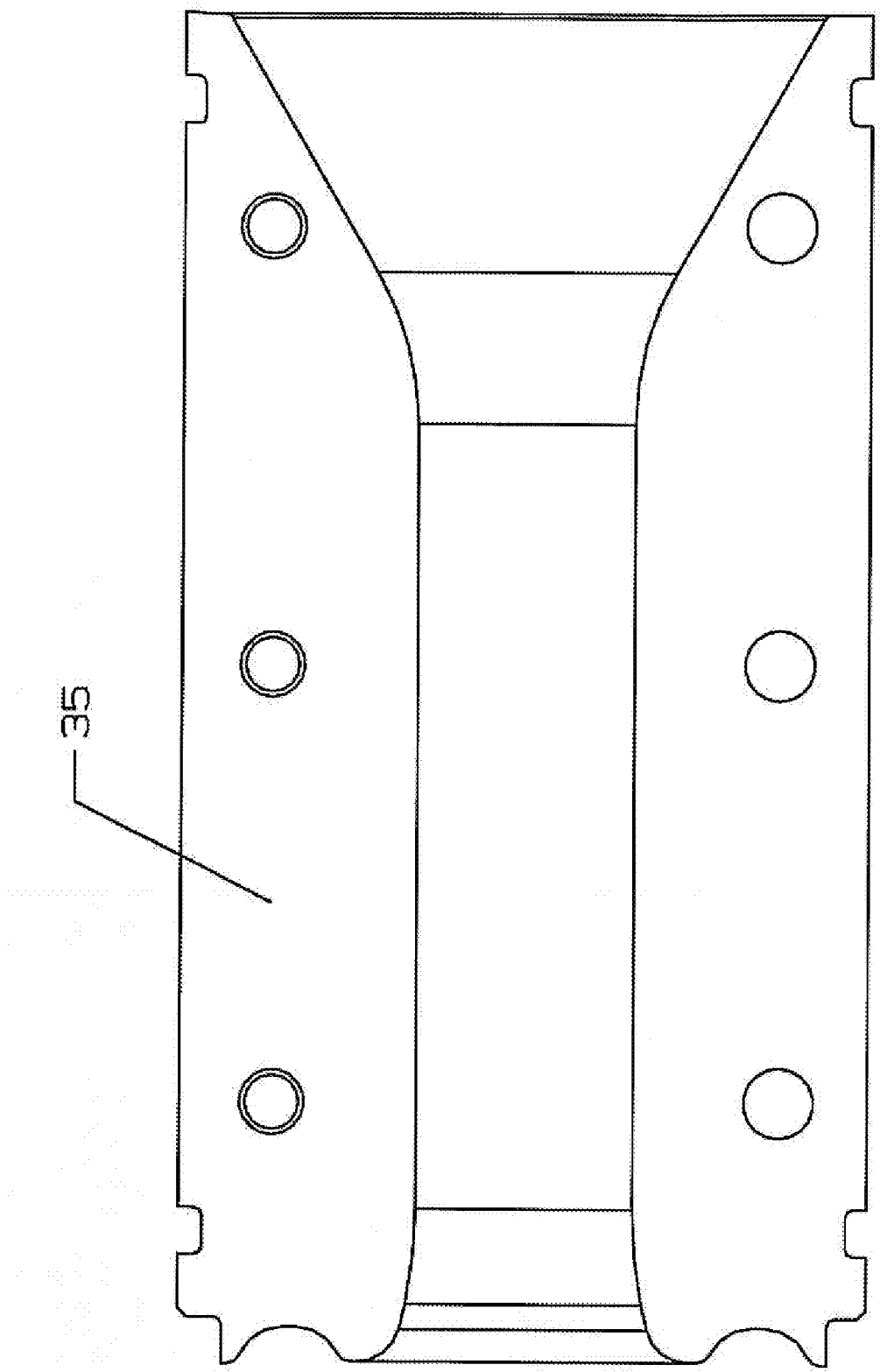
FIG. 16 side view of the inside of the Cover Half.

An alternate embodiment of test Rig 15 is shown in detail in FIG. 4. A Test Specimen tube 51 extends from a Combustor end of the Test Rig 15 to an Exhaust Chamber end. The test specimen tube 51 is supported on the combustor end by a combustor end support member 35 (shown in detail in FIG. 13), and by an exhaust end support member 72 (shown in detail in FIG. 14) at the exhaust chamber end. A combustor 43 with a plurality of Injectors 42 is located in the combustor module 40, a test specimen area 57 is located immediately downstream from the combustor 43, and an exhaust chamber 75 is located immediately downstream from the test specimen section 57. The exhaust end support member 72 has fluid passage therein to carry compressed air from the compressor into an upstream end of the test specimen tube 51. Compressed air flows through the test specimen tube 51 to cool the tube, through the combustor end support member 35, and into a pressure chamber 49. Air flow then passes through a support plate 48 that holds the combustor end support member 35 and into the combustor 43 through holes spaced about the combustor 43. The compressed air in the combustor 43 is mixed with a fuel and burned to produce the hot gas flow which then passes through the test specimen flow path formed between an inner wall of a cooling vessel 52 and the outer surface of the test specimen tube 51. The hot gas flow exits the test specimen section 57 and flows into an exhaust chamber 75 in the exhaust section of the test rig 15.

Figure 5:
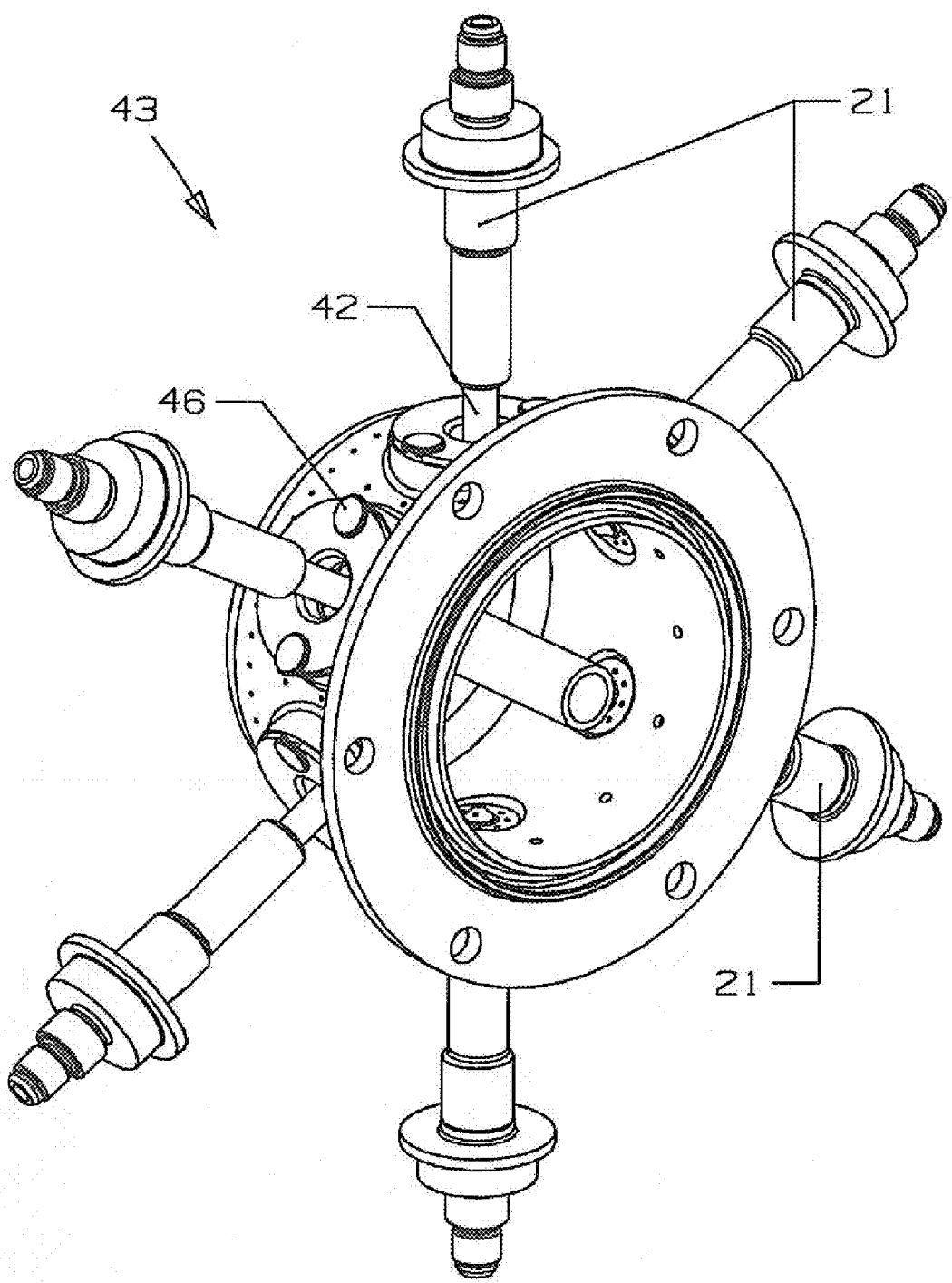
FIG. 5 shows a schematic of the combustor and radial jets assembly.
Figure 6:
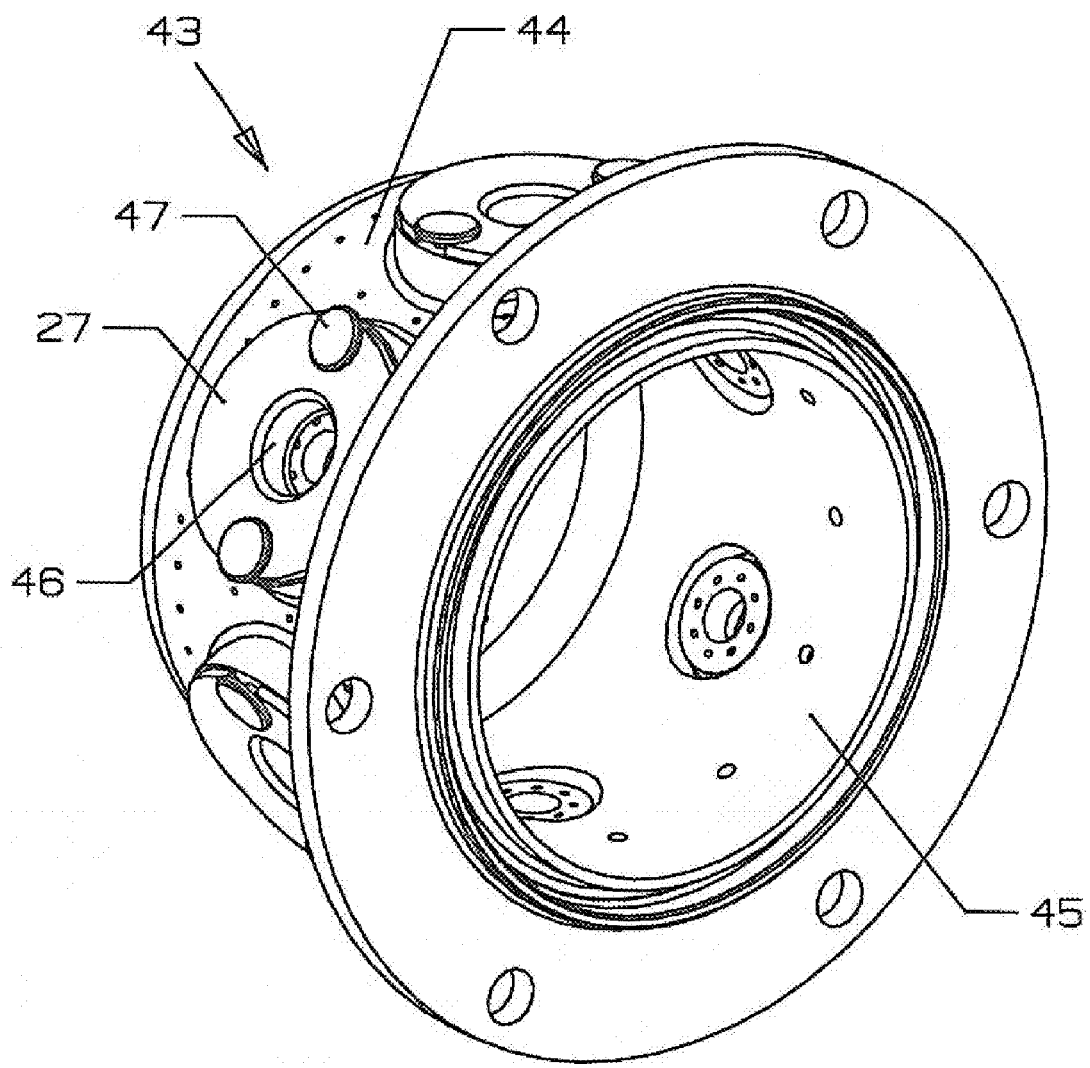
FIG. 6 shows a schematic view of the combustor body.

The combustor is shown in FIG. 5, and includes a cup-shaped outer shell with impingement holes, an inner shell with dilution holes, the inner shell fitting within the outer shell to form an air gap between shells, a swirler in each of the impingement holes, a center body specimen support tube, and 6 fuel nozzles 42. The swirlers mix 30% of the airflow with a fuel from the 6 gas nozzles 42. FIG. 6 shows an assembled combustor 43 with the inner shell 45 and outer shell 44, an injector support 27 for each injector 21, and the holes in which the fuel injectors are placed. The combustor includes an inner shell 45 and an outer shell 44, and a swirler 46 mounted in each of the 6 injector holes. The swirler 46 swirls the compressed air delivered into the combustion chamber of the combustor 43. The swirlers 46 are secured in the holes by bolts 47.

Figure 7:
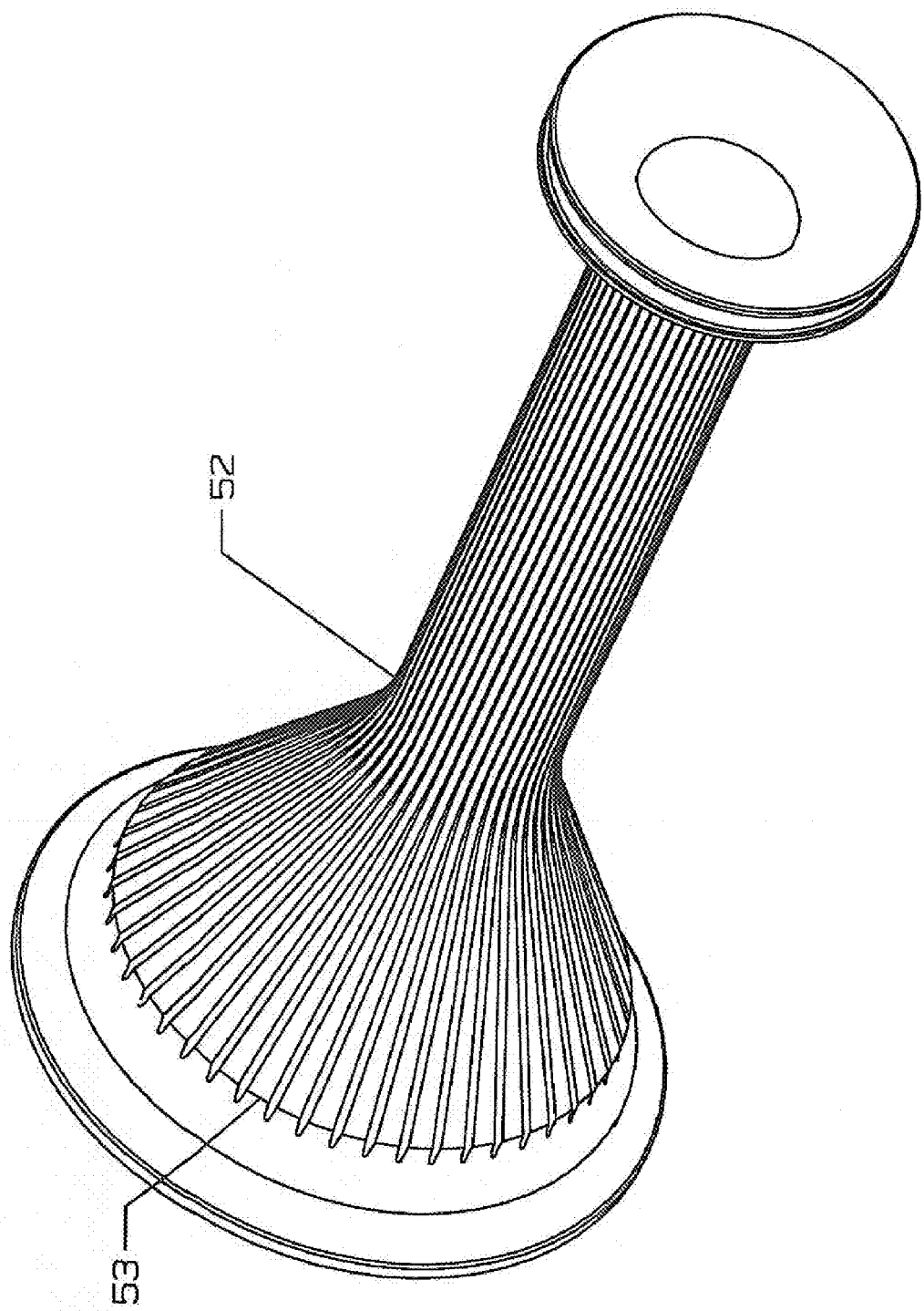
FIG. 7 shows a schematic diagram of a cooling vessel.
Figure 8:
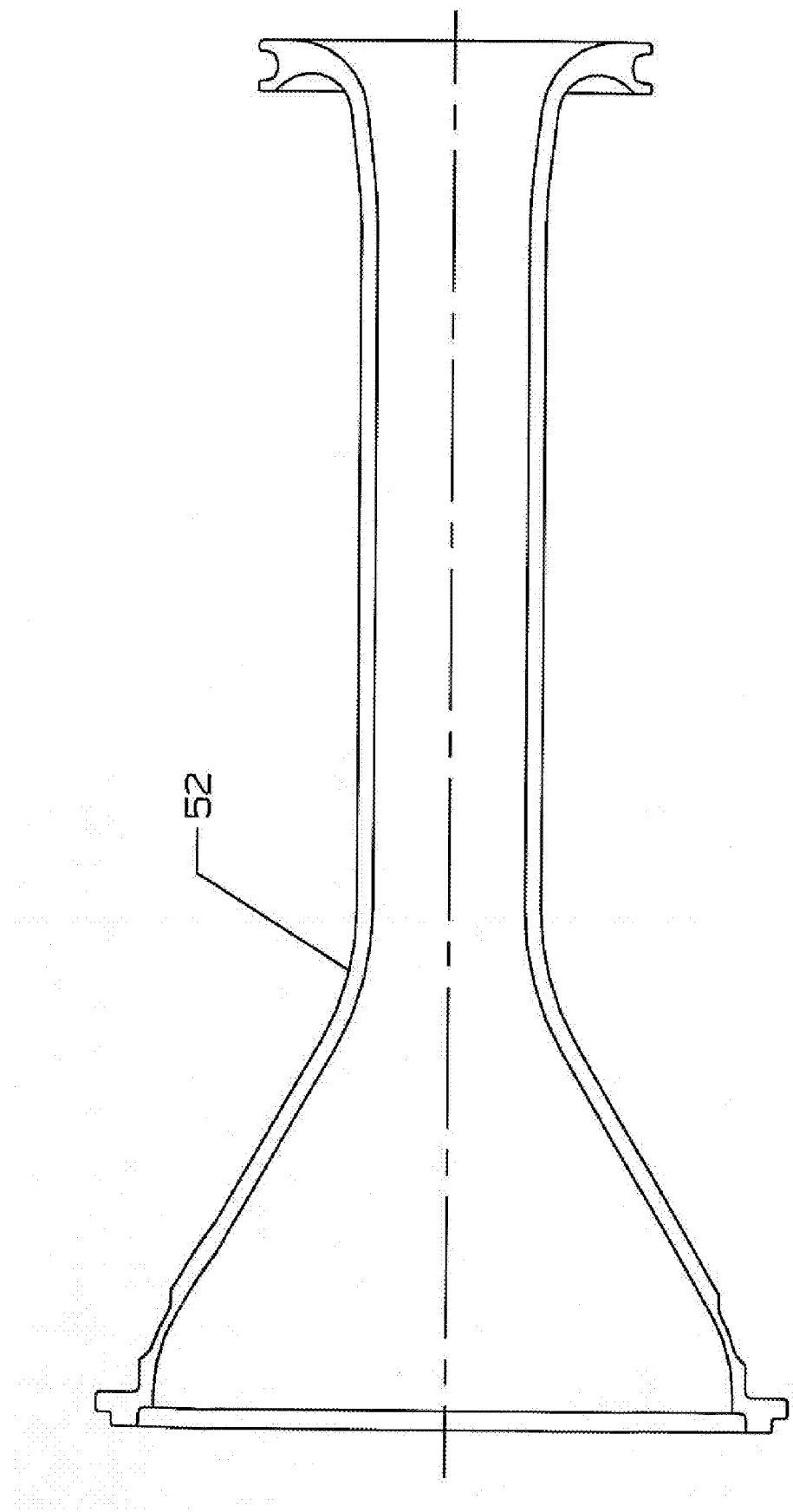
FIG. 8 shows a cross section view of the cooling vessel.
Figure 9:
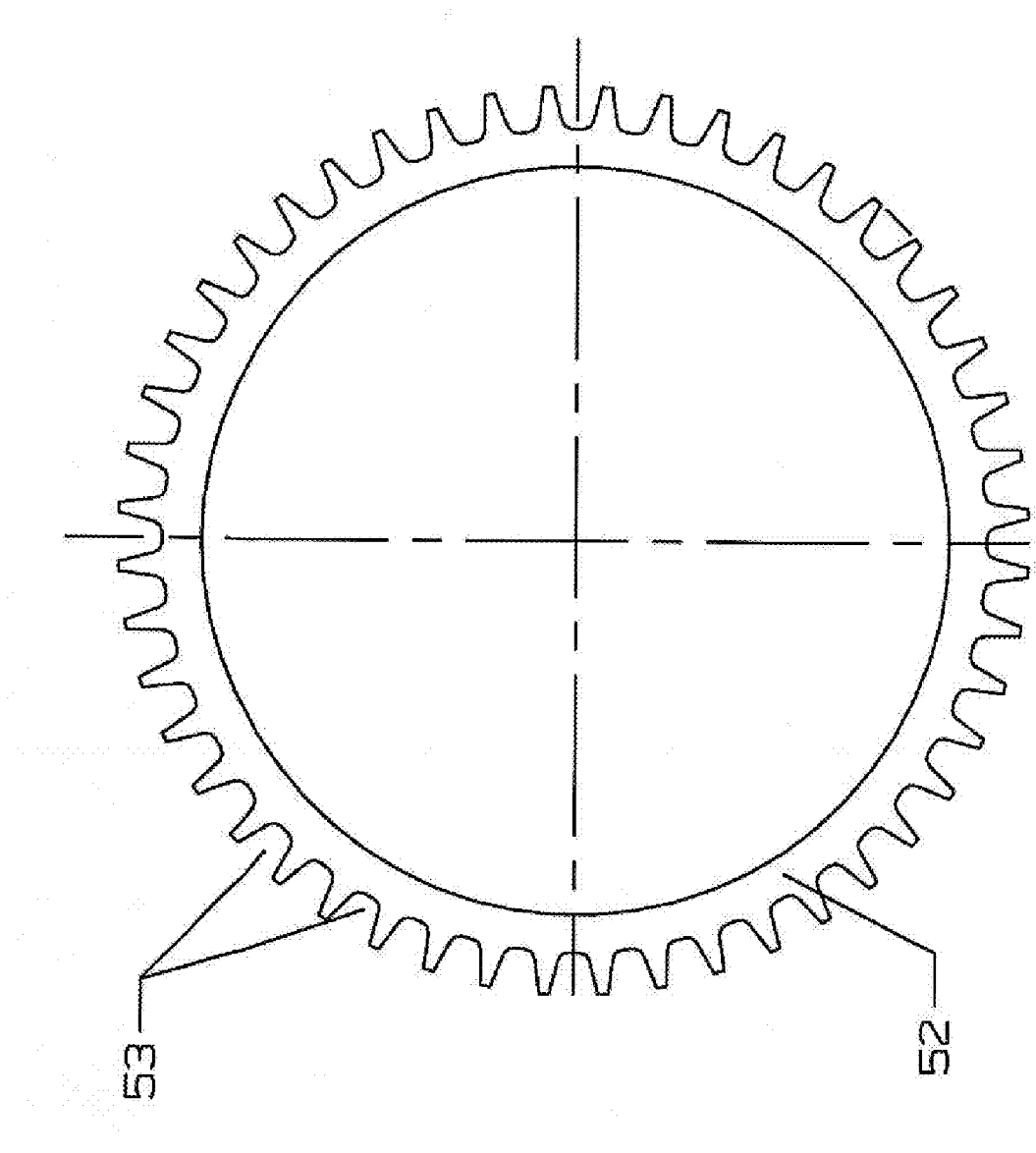
FIG. 9 shows a cross section view of the cooling vessel through FIG. 8.
Figure 10:
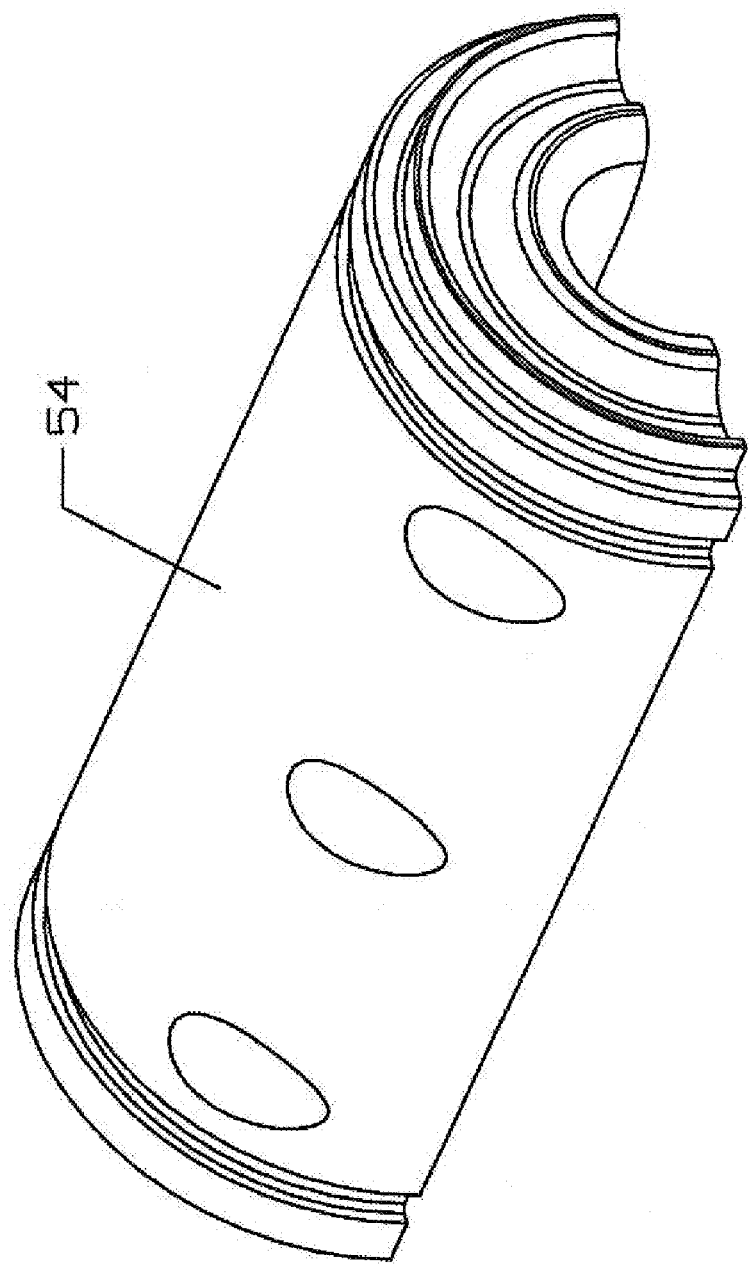
FIG. 10 shows a isometric view of a Cover Half.
Figure 11:
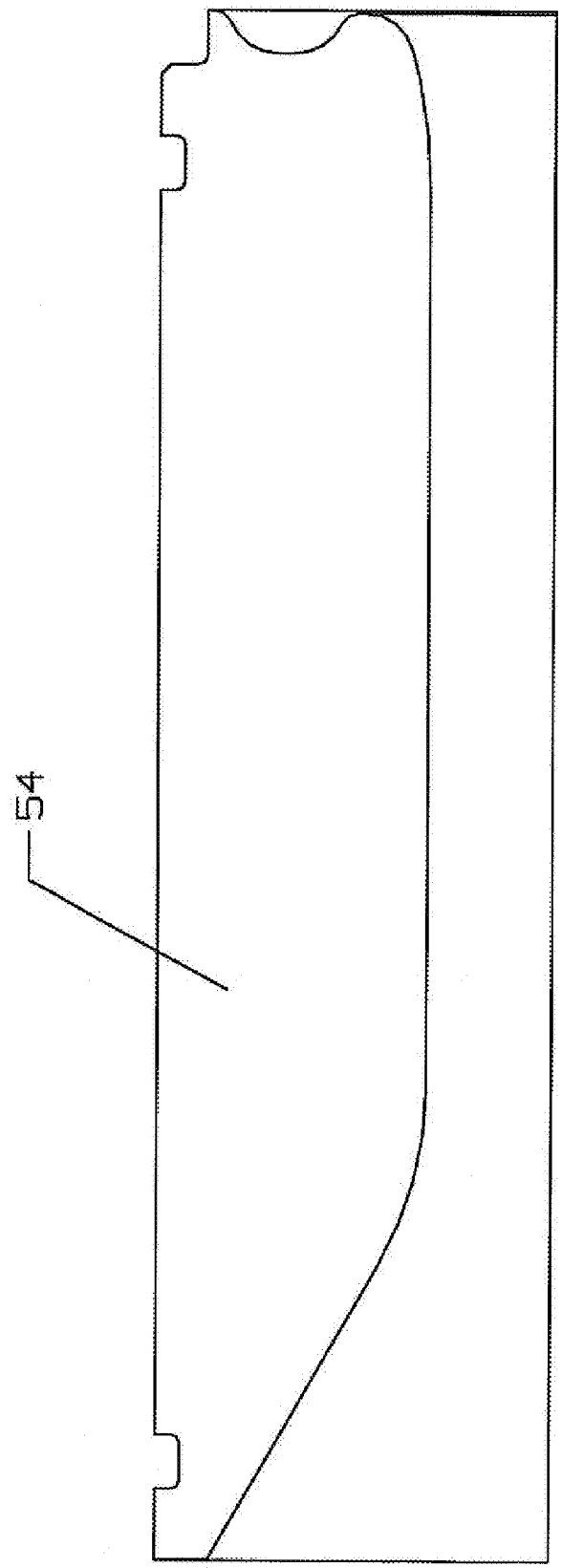
FIG. 11 shows a cross section view of the cover half.

The test vessel and cover assembly includes a copper beryllium cooling vessel 52 shown in FIG. 7 that includes a cone-shaped front portion, a tubular main portion, and a rear annular ring portion. The cooling vessel 52 is hollow and forms the outer hot gas path through the test section 50. The cooling vessel 52 is made of copper beryllium in order to provide a high heat transfer rate through the vessel (the copper) and to provide good structural strength for the vessel (the beryllium). On the outer surface of the cone shaped portion and the tubular portion of the vessel 52 are a series of ribs or grooves 53 milled into the vessel 52 to form cooling water passages. FIG. 9 shows a cross section view of the cooling vessel 52 with the grooves clearly shown. The vessel fits within two Cover Halfs 54 shown in FIG. 10. The cooling vessel 52 fits within hollow portions of the cover halfs 54. Annular rings on the front and rear portions of the cooling vessel 52 are secured within annular grooves formed on the cover halfs 54. Seal rings are placed in a space formed between the annular rings and the annular grooves to form a seal for the cooling water that flows in the space formed between the cooling vessel 52 and the cover 54. With the cooling vessel 52 mounted within the cover 54, a cooling water flow path is formed between the surfaces. The machined grooves 52 on the outer surface of the cooling vessel 52 provide for an increased heat transfer rate from the hot cooling vessel 52 to the cooling water.

Water-cooling is used on the test section housing. This component forms the outer gas path to protect the rest of the housing from the extreme heat loads resulting from the high velocity combustion products. A closed loop system is used (see FIG. 12) in which water enters the test section housing at the combustor end and flows through multiple channels formed on the outer wall of the cooling vessel 52 before exiting at the exhaust chamber end. Copper-beryllium alloys are used for the cooling vessel 52 due to the favorable trade between high thermal conductivity (which reduces thermally-induced stresses) and good strength and resistance to stress relaxation at elevated temperatures.

The test specimens are mounted on a single test specimen tube 51 or on a plurality of annular coupons. Each annular coupon can hold a separate test specimen. This was, several different test specimens of different materials can be tested under the same conditions and at the same time. A plug having a specified diameter is used to support the coupons. The plug supports the coupons and provides for a resistance to the flow of cooling air through the coupons that form the cooling airflow path in the test rig 15. The internal geometry of the specimen can be altered by sizing an internal plug which changes the cooling air velocity and forces the flow along the inside wall of the coupon. The coupons are supported on the plug by a plurality of spacers 53. The coupons have threaded ends so that a plurality of coupons can be joined together to form a test specimen tube 51 to carry the cooling air within the tube while the test specimen materials are exposed to the hot gas on the outer surface thereof. The connection must be strong enough to prevent separation of the coupons during testing, and sealed enough to prevent the hot gas stream from leaking into the cooling air path formed inside the connected coupons. A variety of spacers are used that have different sized openings for different sized plugs. One or more coupons can be used in the test rig to test one or more materials during operation of the test rig. In the preferred embodiment, up to 12 coupons can be assembled to form the test specimen tube 51 and cooling air flow path. The assembly of coupons must extend along the axis of the test rig 15 such that a closed cooling air path is formed in the test rig. The cooling air must flow through the center of the combustor and out the front end, and then used as impingement air for cooling and dilution air for the combustor, as well as compressed sir for burning with the fuel. The coupons must extend from the combustor to the exhaust chamber in which the hot gas stream is exhausted from the test rig 15. High pressure air passing through the coupons on the way to the combustor is first used for cooling the test coupons in order to control the surface temperature and to achieve the desired heat flux. The internal heat transfer coefficients within a stack of specimens can be tailored to achieve the desired operating temperatures by adjusting the size of the internal plugs to establish the desired flow velocity along the inner surface of the cooling passage formed inside the coupons. If the coupons are used to form the test specimen support tube, the tube and the plug extend into the forward and rearward support members 35 and 72.

Figure 12:
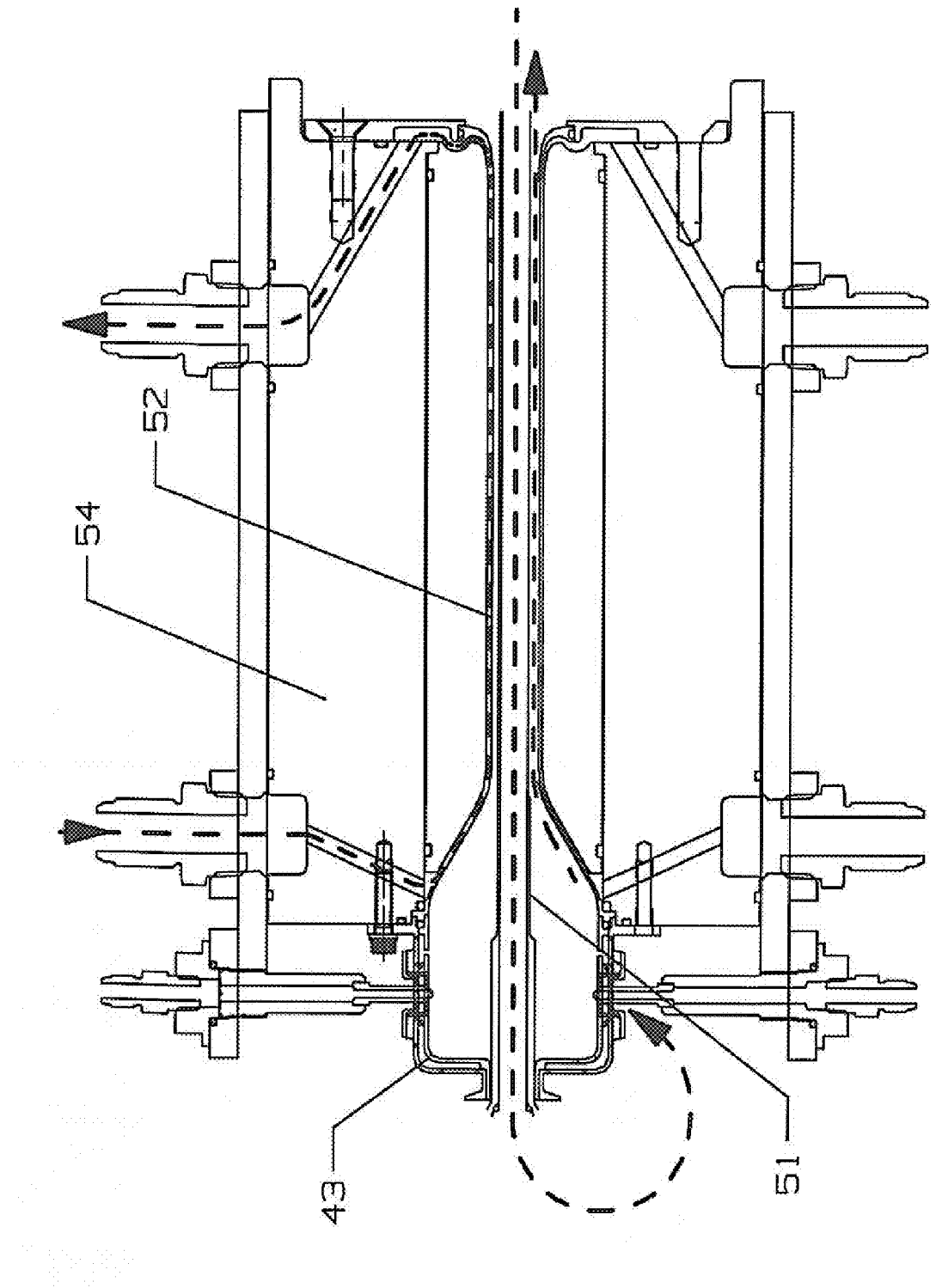
FIG. 12 shows a schematic of the fluid circuits of hot gas, cooling air and cooling water flow paths.

The flow paths for the hot gas, the cooling water, and the cooling air are shown in FIG. 12. Compressed air from the compressor is supplied to the exhaust side of the test specimen tube to act as cooling air, and then into the combustor 43 to form the hot gas, which then flows over the test specimen tube 51 in the opposite direction to that of the cooling air inside the tube 51. Cooling water flows into the cooling water path from the upstream side of the cooling vessel 52 to the downstream side, in the same direction as the hot gas flows.

The material to be tested in the rig is placed on the outside surface of the tube 51. The tube 51 is about 8 inches in length, ½ inch in diameter, and with a wall thickness of about 0.035 inches. The tube 51 is made from a high temperature resistant nickel alloy or ceramic matrix composite material that can withstand the high temperatures of a gas turbine engine. The materials of which the blades are made from would be suitable for use in the tube 51. If the plurality of test coupons is used, the test coupons would be made from the same material as the single tube 51, and the materials to be tested would be placed on the outside surface of the coupons. The test specimen tube 51 or plurality of coupons are secured to the combustor end support member 35 and exhaust end support member 72 by threads, where the tube 51 is screwed into threads on the support members. If the tube 51 is formed of individual coupons, each coupon would have an axial length of about 1 inch. A plurality of coupons would be connected together, and longer extensions would be connected to the forward end and rearward end of the assembled coupons in order to extend the tube 51 into the forward and rearward support members 35 and 72. The assembly of one inch coupons need only occupy an axial length that is within the confines of the testing area within the cooling vessel 52.

Another feature of the present invention is a means to provide uniform thermal loading of the test specimens. One means of providing for this feature is to provide a low speed rotation of the specimens sufficient to minimize environmental variation due to combustor pattern factor or specimen orientation. A motor 21 (see FIG. 2) is connected to a magnetic coupling 20 in order to eliminate an opening in the test rig for a shaft to pass through. This eliminates the need for a seal, which would allow for high pressure air to leak out of the test rig 15. The magnetic coupling 20 includes an external rotor 22 with a plurality of magnets 24 facing inward, and an internal rotor 23 having a plurality of magnets 24 facing outward, toward the magnets on the external rotor 22. A pressure vessel 52 separates the two rotors 22 and 23 to eliminate an opening for a shaft to connect the electric motor 21 to the specimen tube 51. The internal rotor 23 is connected to the test specimen tube 51 by a splined coupling shaft 32. This coupling is splined in order to allow for a piston to produce axial movement of the tube 51 in order to produce the axial loading on the test specimen.

Thermal-mechanical fatigue testing at engine conditions is accomplished by the use of a piston and cylinder assembly connected to the test coupons to apply an axial load to the test specimens during operation of the test rig. The piston and cylinder assembly (see FIG. 3) can apply a variable axial force to the test coupons by pneumatic loading. A diaphragm 31 (piston) is connected to the test specimens to generate an axial tensile force through a shaft. The shaft is connected to the coupons. Air pressure supplied from the compressor is regulated by a control valve into a first pressure chamber 35. Air pressure from the compressor is supplied to a second pressure chamber 36 through a pre-heater to preheat the air to about 1000 F. The air pressure is regulated in the second pressure chamber 36 to control the axial force acting on the coupons. The high-pressure air in the second pressure chamber 36 also provides for a seal for the translating shaft penetrating the pressure vessel. In order to prevent the piston axial load applying assembly from pulling the coupons out from the test rig, an axial thrust bearing 73 is positioned downstream of the exhaust chamber. The piston axial load applying assembly is capable of producing an axial load on the coupons of about 6,000 lbs.

Figure 2:
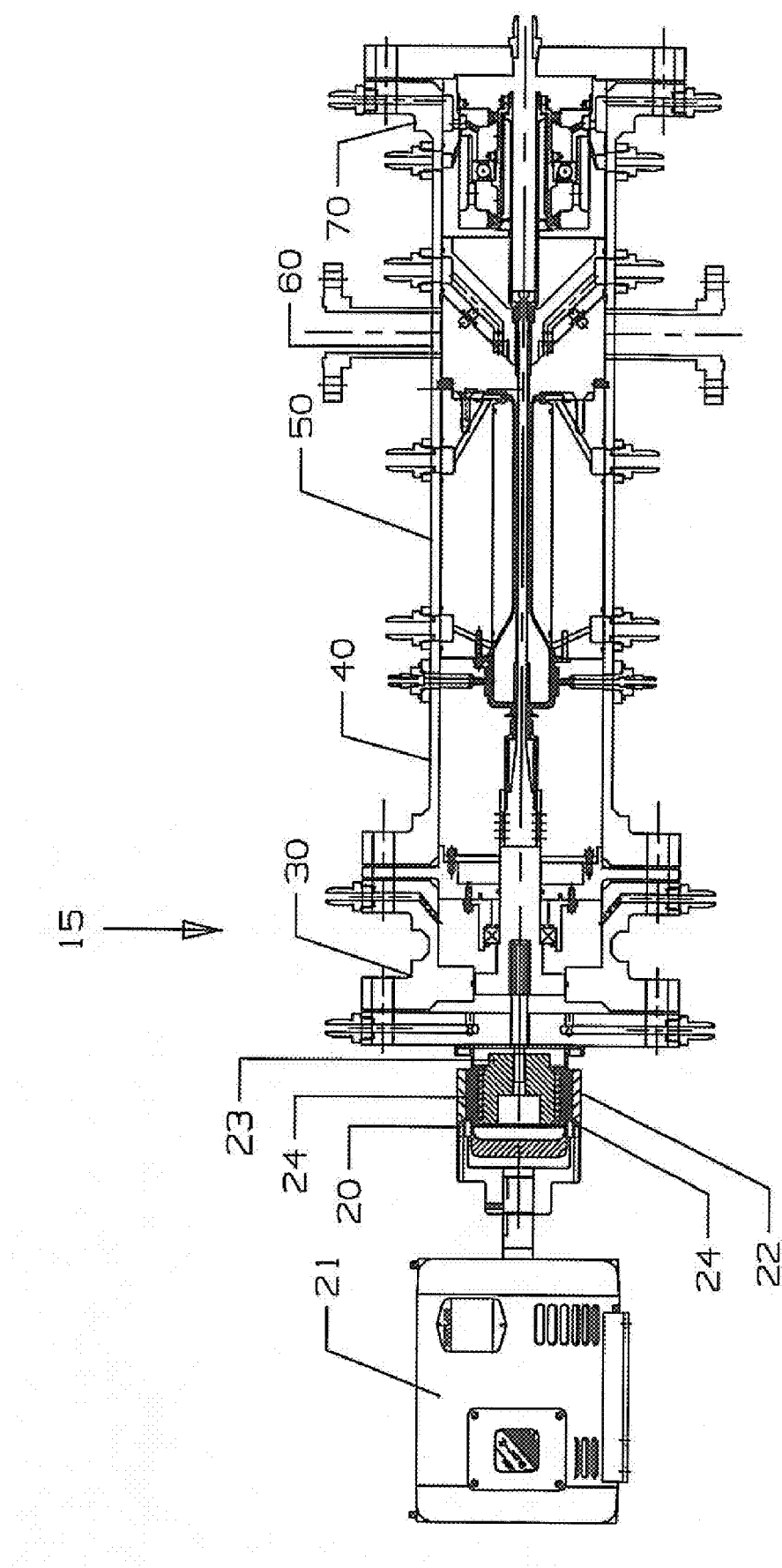
FIG. 2 shows a cross section view of the modules assembled together that form the test rig.

The test coupons and test specimens are rotatably driven by an external electric motor 21 coupled to the internal rotor shaft by a magnetic coupling assembly 20 shown in FIG. 2. Extending out from the piston and cylinder assembly used to produce an axial load on the coupons is a splined coupling shaft 32 that rotates along with the specimen support shaft 51. The splined coupling shaft 32 rotatably connects to the specimen support shaft 51. Connected to the splined coupling shaft is an internal rotor 23 having a plurality of magnets 24 facing outward. The internal rotor 23 rotatably fits within the pressure vessel. An external rotor 22 includes a plurality of magnets 24 facing inwards and fits over the pressure vessel. The external rotor 22 is rotatably secured to an output rotor shaft of a 5 HP electric drive motor 21 used to rotate the specimen support shaft. A typical rotation speed would be about 1,000 rpm. The magnets on the internal rotor 23 form a magnetic connection with the magnets on the external rotor 22 such that rotation of the external rotor 22 by the electric motor produces a rotation of the internal rotor 23 and the specimen support shaft.

The electric drive motor 21 is needed to provide for a uniform temperature loading condition on the test specimens in order to mitigate combustor pattern factor effects. A thrust bearing 73 is required at the exhaust chamber end of the test rig, a roller bearing 33 at the combustor end, and a number of rotating seals is required along the length of the shaft. The magnetic drive coupling 20 allows for the electric motor 21 to be located external to the test rig 15 and avoid penetrating the pressure vessel 30 with a rotating shaft. During operation, the pressure vessel 30 is exposed to high-pressure compressed air. Without the magnetic coupling 20, a seal would be required to seal the shaft between the electric motor 21 and the specimen support shaft. With the magnetic coupling 20, this seal is not required.

An exhaust system and heat recovery system for the test rig is described next with respect to FIG. 17. Compressed air is supplied through the hollow specimen shaft 57 (formed by the coupons and plug) and into the combustor where a fuel is burned with the air. The resulting hot gas flow passes through a space formed between the hollow specimen shaft 57 and the cooling vessel 53, and then into an exhaust chamber 61 just downstream from the coupons and cooling vessel 53. The exhaust gas is directed radial outward by a conical shaped quenching support 62 fitted with misting nozzles 63. An annular array of water inlet ports 64 connects water passages that lead into the misting nozzles 63. A water flow rate of 3 gallons per minute will cool the exhaust flow to about 600 F.

Figure 17:
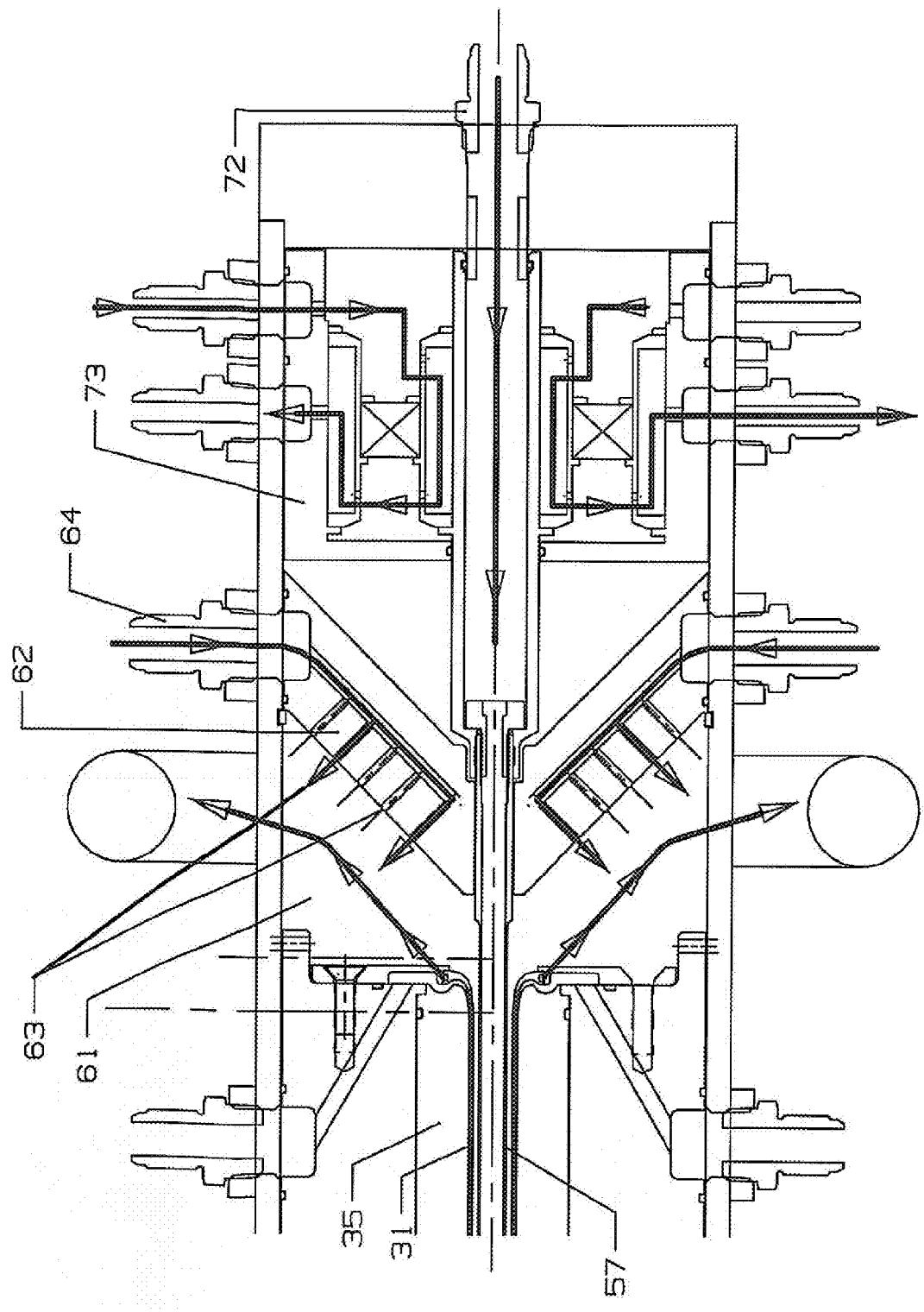
FIG. 17 shows a cross section view of an Exhaust Section of the Test Rig with Water Cooling and Bearing Cooling paths.

A thrust bearing support 73 is also shown in FIG. 17. The thrust bearing 73 is required to prevent the specimen support shaft 57 from being pulled out of the test rig 15 by the piston 31 and cylinder axial load producing assembly described earlier. An extension 72 of the hollow specimen support shaft extends through the thrust bearing 73 and out the rear face of the test rig. A fluid conduit supplying the compressed air from the compressor is connected to the hollow specimen support shaft at this rear face of the test rig. A cooling air arrangement delivers cooling air to the thrust bearing 73 support assembly to provide cooling air to this part of the test rig.

Compressed air to the test rig is supplied by an Ingersoll-Rand Centac, 3-stage, intercooled centrifugal compressor (model #2C1140M3). This compressor has a discharge capacity of 3,136 SCFM at a pressure of 350 psig. The compressor is driven by a Siemens 1,500 ho, 4,160 V electric motor.

A bank of air pre-heaters, each 50 kW, is used to heat the compressor discharge air prior to entering the test section as shown in FIG. 3. This heater can preheat the inlet air to nearly 1,000 F, and are rated to 350 psi.

Figure 18:
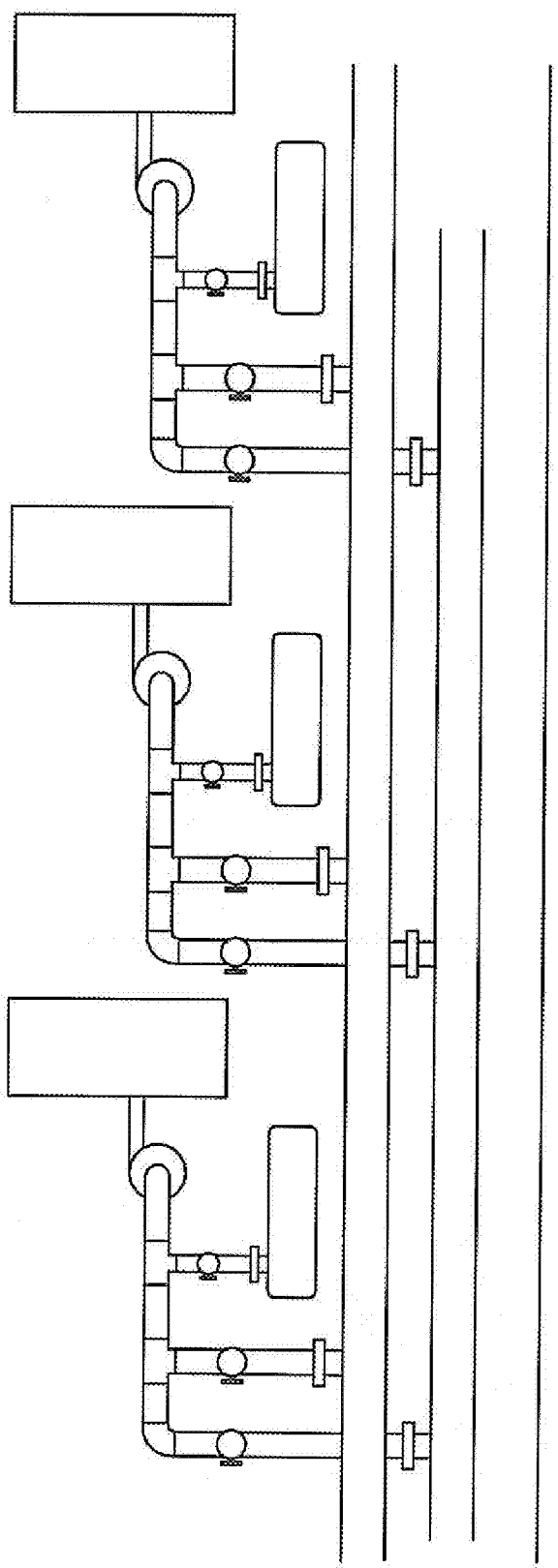
FIG. 18 shows a schematic diagram of 3 test rigs connected to a common fuel source.

The test facility of the present invention can be setup to operate a plurality of rigs operating on various gaseous fuels (FIG. 18).

Rig control and health monitoring instrumentation requirements include the inlet and exit temperature and pressure for each flow stream; air, fuel and cooling water. The rig control plan is to set an airflow level and pressure using air control valves and venturi nozzles, and then adjust fuel flow to attain the fuel/air ratio corresponding to the desired combustor and test section exit temperature. Thermocouples are placed on critical components to monitor conditions that could adversely impact the test rig life.

Figure 19:
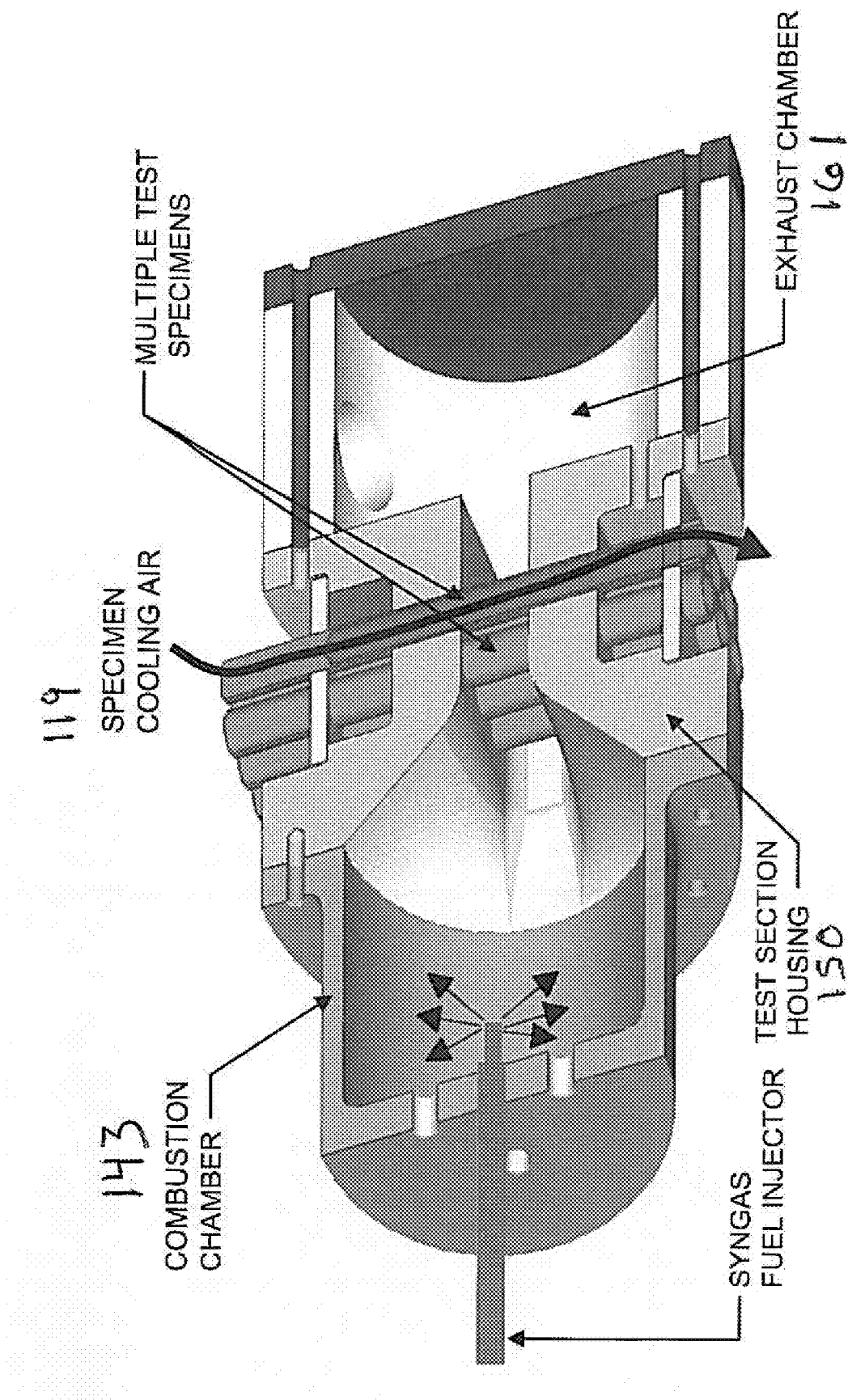
FIG. 19 shows a second embodiment of the test rig

An alternate embodiment of the test section is shown in FIG. 19, and shows an alternative embodiment for the combustor module, the test section module, and the exhaust section module used in the preferred embodiment. This embodiment has multiple specimens 119 arranged parallel to each other, all mounted transverse to the hot gas flow. The test section comprises a combustor 143, a test section housing 150, and an exhaust chamber 161. The air supply for this rig is from an electric motor driven industrial compressor. Compressed air is routed through each of the cylindrical specimens 119 for internal cooling, and is then collected in a combustor plenum to be used for combustor cooling and then in the combustion process. Hot gas accelerates as it exits the combustor and flows through one or more rows of test specimens 119.

The embodiment of FIG. 19 has the advantage of simulating the leading edge of turbine airfoils, as the hot gas impinges on the tubular specimens 119 and then flows around either side, duplicating the effect of a real gas turbine engine. An axial load can be applied to the individual test specimens 119 by providing an axial force along the tubular specimens.

Figure 20:
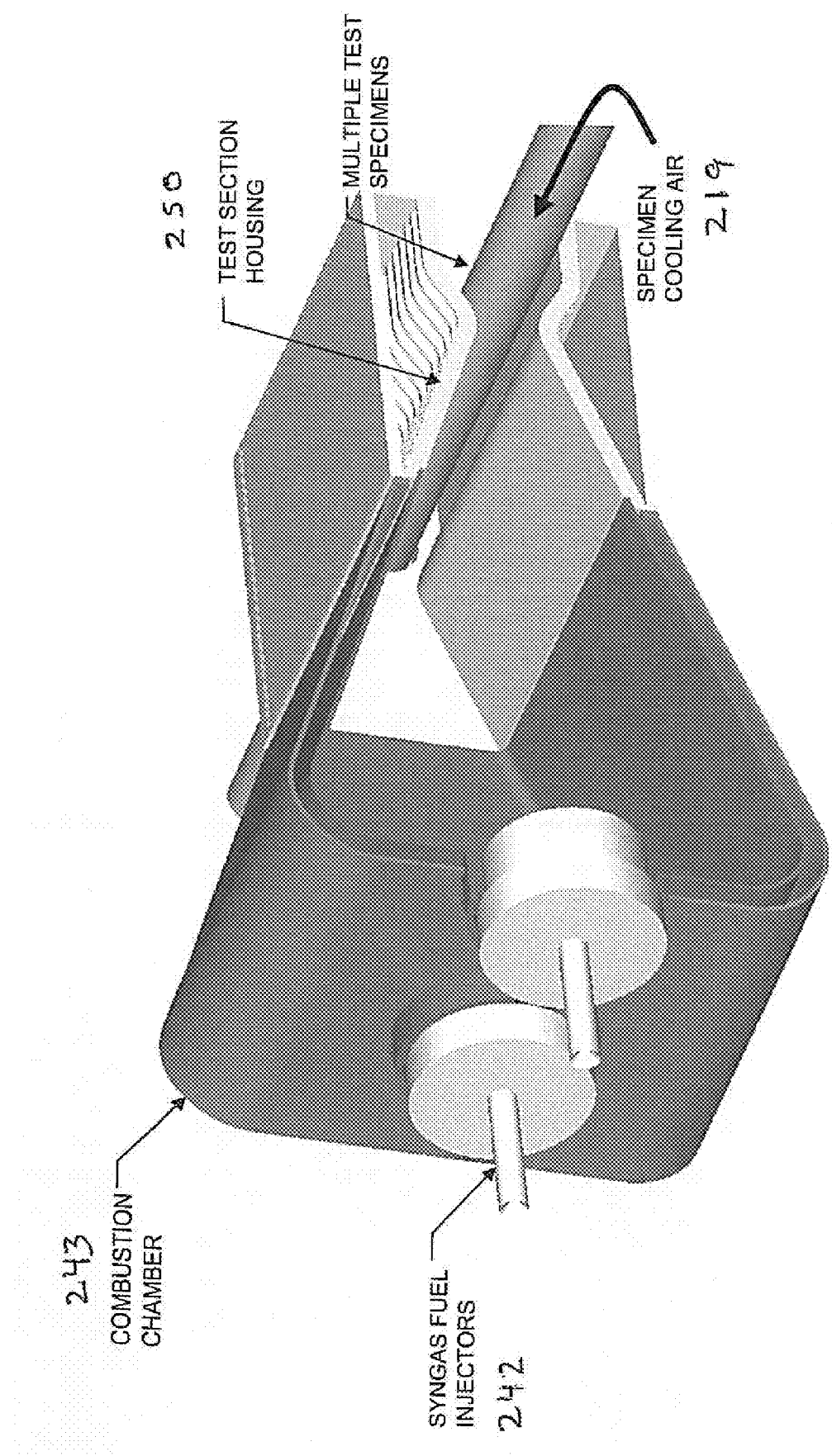
FIG. 20 shows a third embodiment of the test rig.

A third embodiment of the test section is shown in FIG. 20. Another transverse test section configuration is shown in which the series arrangement has multiple specimens 219 stacked end-to-end along the same axis. Also in the FIG. 20 embodiment, compressed air is routed through the cylindrical specimens 219 for internal cooling and then is collected in a combustor plenum to be used for combustor cooling and then in the combustion process. Hot gas accelerates as it exits the combustor 243 and flows over the stack of specimens 219 positioned transversely across the combustor exit. This embodiment includes two fuel injectors 242, a combustion chamber, a test section housing 250, and multiple test specimens 219 arranged transversely to the hot gas path. This embodiment has the advantage of simulating the leading edge of turbine airfoils, as hot gas impinges on the tubular specimens 219 then flows around either side. Leakage of cooling air between the specimens 219 then flows around either side. Leakage of cooling air between the specimen 219 and the test section shrouds is greatly reduced relative to the parallel arrangement, as just two seals are now needed, resulting is reduced leakage. A problem of applying uniform tensile force to each specimen 219 is eliminated, as a single device can be used to load the entire stack of specimens 219 simultaneously.

We claim the following:

1. A test rig for testing a material under a high pressure and high temperature conditions, the test rig comprising:
   a plurality of separate modules connected together to form a serial arrangement of the test rig,
   the plurality of modules including:
   a combustor module;
   a test section module connected to the combustor module downstream therefrom;
   the test section including a conduit having an inner surface and an outer surface with a material to be tested mounted on one of the two surfaces and a cooling fluid passing over the other of the two surfaces to provide cooling for the material; and,
   an exhaust module connected to the test section module downstream therefrom.

2. The test rig of claim 1, and further comprising:
   each module is cylindrical in shape.

3. A test rig for testing a material under a high pressure and high temperature conditions, the test rig comprising:
   a plurality of separate modules connected together to form a serial arrangement of the test rig,
   the plurality of modules including:
   a combustor module;
   a test section module connected to the combustor module downstream therefrom; and,
   an exhaust module connected to the test section module downstream therefrom; and,
   a mechanical load module connected to the combustor module upstream therefrom for applying a tensile load to a test specimen.

4. The test rig of claim 3, and further comprising:
   a specimen rotation module connected to the mechanical load module upstream therefrom.

5. The test rig of claim 4, and further comprising:
   the specimen rotation module includes a magnetic coupling to connect a load piston in the mechanical load module to a rotary drive shaft.

6. The test rig of claim 5, and further comprising:
   the magnetic coupling comprises an internal rotor connected by a spline shaft to the load piston, and an external rotor connected to the rotary drive shaft, the two rotors having a plurality of magnets forming the magnetic coupling.

7. A test rig for testing a material under a high pressure and high temperature conditions, the test rig comprising:
   a plurality of separate modules connected together to form a serial arrangement of the test rig,
   the plurality of modules including:
   a combustor module;
   a test section module connected to the combustor module downstream therefrom; and,
   an exhaust module connected to the test section module downstream therefrom; and,
   a thrust bearing & air inlet section module connected to the exhaust section module downstream therefrom.

8. A test rig for testing a material under a high pressure and high temperature conditions, the test rig comprising:
   a plurality of separate modules connected together to form a serial arrangement of the test rig,
   the plurality of modules including:
   a combustor module;
   a test section module connected to the combustor module downstream therefrom; and,
   an exhaust module connected to the test section module downstream therefrom; and,
   the exhaust module is also a thrust bearing & air inlet section module having an air supply passage arranged at about 90 degrees to a longitudinal axis of the test rig.

9. A test rig for testing a material under a high pressure and high temperature conditions, the test rig comprising:
   a plurality of separate modules connected together to form a serial arrangement of the test rig,
   the plurality of modules including:
   a combustor module;
   a test section module connected to the combustor module downstream therefrom; and,
   an exhaust module connected to the test section module downstream therefrom; and,
   the test section module includes a cooling vessel having a tubular shaped portion on the downstream end and a conical shaped portion on the upstream end, the cooling vessel forming a flow path for a hot gas flow through the test section module on the inner side and a cooling water flow path on the outer side.

10. The test rig of claim 9, and further comprising:
    the cooling vessel having longitudinal extending fins on a portion of the outer side to increase the heat transfer rate from the cooling vessel.

11. A test rig for testing a material under a high pressure and high temperature conditions, the test rig comprising:
    a plurality of separate modules connected together to form a serial arrangement of the test rig,
    the plurality of modules including:
    a combustor module;
    a test section module connected to the combustor module downstream therefrom; and,
    an exhaust module connected to the test section module downstream therefrom; and,
    a test specimen tube extending through the test section module, the test specimen tube forming a cooling air conduit to supply cooling air to a test material and to supply air to the combustor.

12. The test rig of claim 11, and further comprising:
    the test specimen tube is supported by the combustor module on one end of the tube and supported by the exhaust module on the other end of the tube.

13. The test rig of claim 12, and further comprising:
    the test specimen is supported by an exhaust end support outside from an exhaust chamber, the exhaust end support forms substantially an L-shape connection with the test specimen tube and includes a cooling air passage therein in fluid communication with the test specimen tube to supply cooling air to the test specimen tube.

14. The test rig of claim 11, and further comprising:

the exhaust module includes a heat recovery system having a quenching support with water injection ports to inject water into a hot gas flow from the test module to quench the hot gas flow.

15. The test rig of claim 14, and further comprising:

the quenching support is conical shaped and includes a plurality of misting nozzles to inject water into a hot gas flow from the testing module.

\* \* \* \* \*

UNITED STATES PATENT AND TRADEMARK OFFICE
CERTIFICATE OF CORRECTION

PATENT NO. : 7,574,904 B1
APPLICATION NO. : 11/263522
DATED : August 18, 2009
INVENTOR(S) : Danile O. Davies et al.

Page 1 of 1

It is certified that error appears in the above-identified patent and that said Letters Patent is hereby corrected as shown below:

In the Specifications:

Col. 1, line 7: please replace "None" with the following new paragraph:

This invention was made with Government support under contract number DE-FG02-03ER83660 awarded by the Department of Energy. The Government has certain rights in the invention.

Signed and Sealed this
Twenty-first Day of May, 2013

Teresa Stanek Rea
*Acting Director of the United States Patent and Trademark Office*